United States Patent Office 2,944,972
Patented July 12, 1960

2,944,972

MIXED METAL SALTS OF ORGANIC THIOPHOSPHATES AND PROCESS FOR PREPARING THE SAME

Charles B. Welsh, Philadelphia, Pa., assignor to Gulf Oil Corporation, Pittsburgh, Pa., a corporation of Pennsylvania No Drawing. Filed Oct. 26, 1956, Ser. No. 618,459

8 Claims. (Cl. 252—32.7)

This invention relates to a process for preparing stable, light-colored oil-soluble mixed metal salts of thiophosphate esters that are essentially free from obnoxious odors, and also the products of such process, as well as to mineral lubricants containing such products.

Oil-soluble metal salts, particularly divalent metal salts, of thiophosphate esters have found use as improvement agents in mineral lubricating oils because of their detergent, antioxidant, anti-corrosion and anti-wear properties. For example, zinc dihexyl dithiophosphate and zinc dicyclohexyl dithiophosphate form especially effective mineral lubricant additives.

The metal salts of thiophosphate esters suitable for use as lubricant additives can be prepared by reacting a basic divalent metal compound with acidic dithiophosphoric diesters that are prepared in turn by reacting a monohydric alcohol or phenol with phosphorus pentasulfide in a mole ratio of about 4:1. Certain side reactions can take place during the course of the foregoing reactions, thereby leading to the formation of a complex mixture of by-products, including not only various thiophosphoric esters and salts, but substances which are either malodorous as such or which tend to decompose into or interact to form malodorous impurities. The nature of these malodorous impurities is such that even in minute proportions they tend to impart highly undesirable odors to mineral lubricants in which they are employed. As a matter of fact, these odors can be so strong as to permeate the passenger compartments of motor vehicles using motor oils containing the above-mentioned malodorous by-products, to the great discomfort of the passengers therein. Previous attempts to produce stable, essentially odor-free metal salts of thiophosphate esters have met with only limited success.

It has now been found that preparation of salts of crude thiophosphoric esters in the manner of this invention will not only result in a light-colored product of unusual stability and essentially free from malodorous impurities but also in a product of novel chemical composition effective as an improvement agent in mineral lubricants. The present invention relates to such preparation and includes reacting aliphatic monohydric alcohols or phenols containing 6 to 14 carbon atoms on the average with phosphorus pentasulfide in a mol ratio of about 4:1 at a temperature of about 130° to 350° F. The product of this reaction is then caused to react with zinc or a basic zinc compound in a mol ratio of about 0.5 to about one mol of the zinc or zinc compound per mole of phosphorus pentasulfide at temperatures of about 60° to 180° F. The product of the foregoing reaction is then caused to react at a temperature of about atmospheric temperature to 300° F. with sufficient alkaline earth metal base to raise the pH of the reaction mixture to at least about 6 and about 0.5 to about 2 percent by weight of the mixture of benzoyl peroxide. The invention also includes the product of the foregoing process as well as mineral oils containing the same. Although the products obtained by the above-described process in its entirety are considered unique and especially advantageous, the steps of the process involving pH adjustment and treatment with benzoyl peroxide are considered to possess utility in treating other zinc thiophosphate esters containing malodorous impurities, regardless of how they are prepared. For this reason the invention includes treatment of such other zinc thiophosphate esters. However, the products resulting from the treatment of such other zinc thiophosphate esters will not be identical with those produced by the entire process of this invention.

Although we do not intend to be bound by any theoretical consideration, it appears that preparation of mixed metal thiophosphate esters according to the process of this invention results in modification of the malodorous impurities produced with thiophosphate ester salts to a form in which they are no longer objectionable. Also, in view of the novel chemical composition resulting from the process it appears that the steps of the precess in its entirety combine to produce a new form of thiophosphate ester salts having distinct properties.

The initial zinc salts of thiophosphoric esters disclosed herein are conveniently prepared by reacting a suitable monohydric alcohol or phenol with phosphorus pentasulfide in mol proportions of about 4:1. It is preferred to employ an excess of the alcohol or phenol so as to insure complete reaction of the phosphorus pentasulfide. However, this is not essential, as small amounts of unreacted phosphorus pentasulfide can be removed by filtration. Any monohydric alcohol or phenol, including mixed alcohols and phenols, having a molecular structure and a molecular weight such as to impart good oil solubility to the ultimate metal salt can be used. Thus, open chain or cyclic aliphatic alcohols containing 6 to 14 carbon atoms on the average can be used. Excellent results have been obtained with Oxo octyl alcohols, which as is known comprise mixed isomeric branched chain octyl alcohols, principally dimethyl hexanols, prepared by subjecting mixed isomeric heptenes to the well-known Oxo synthesis process. Examples of other alcohols are hexanol, heptanol, 2-ethylhexyl alcohol, lauryl alcohol, tetradecanol, cyclohexanol, methyl cyclopentanol, cycloheptanol, methyl cyclohexanol and propyl cyclohexanol. The use of unsaturated, or olefinic, alcohols, such as octenol, dodecenol and tetradecenol is also contemplated. It is not essential that the alcohol component consist entirely of alcohols containing 6 or more carbon atoms, and mixed alcohols, for example, mixtures of say 80–90 percent octyl alcohol and 20–10 percent propyl alcohol can be used and are included by the invention. Such mixtures will contain an average of 7 to 7.5 carbon atoms per molecule. Examples of phenols within the scope of this invention are phenol, cresol, octyl phenol and tertiary-butyl cresol. The alcohols and phenols need not be pure and mixtures of either or both can be used with good results. The invention further includes both alcohols and phenols that contain substituents that do not adversely affect oil-solubility in the ultimate compounds.

The reaction of the alcohol or phenol with phosphorus pentasulfide takes place with relative ease at moderately elevated temperatures and is most conveniently carried out at atmospheric pressure. It has been found suitable to maintain the temperature of this reaction between about 130° F. and about 350° F. In the early stages of the reaction temperatures in the lower part of the range are suitable, but when the reaction nears completion as evidenced by a reduced rate of evolution of hydrogen sulfide, the temperature is preferably raised to at least about 200° F., preferably about 300° F., in order to insure essentially complete reaction of the phosphorus pentasulfide. The reaction of alcohol or phenol with phosphorus pentasulfide may be carried out in an inert solvent, such as a mineral lubricating oil or benzene, if desired.

The time required for the foregoing reaction to take place will vary principally according to the reaction temperature and according to the quantity of reactants employed, and to a lesser extent according to the nature of the alcohol or phenol employed. The use of a solvent or diluent in the reaction also tends to influence the rate of the reaction. Within the limits of influence of such factors, the reaction will normally be substantially complete within about 6 hours. Ordinarily, from about 30 minutes to two hours will suffice. The completion of the reaction is most clearly evidenced by the disappearance or substantial disappearance of solid phosphorus pentasulfide.

The principal product of the reaction of alcohol or phenol with phosphorus pentasulfide in a mol ratio of 4:1 is ordinarily considered to be a diester of thiophosphoric acid having the formula:

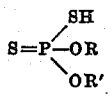

where R and R' are like or unlike ester-forming radicals derived from alcohols or phenols of the kind disclosed above. Analysis of the product obtained as described indicates that the phosphorus:sulfur ratio conforms closely to the theoretical ratio for the above-illustrated formula, that is about 1:2. Also possible, but in lesser amounts, are other thiophosphoric acid esters such as those having the following formulae:

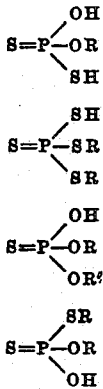

where R and R' are as indicated above, along with still smaller amounts of the malodorous impurities mentioned above.

In order to obtain the desired zinc salts of the foregoing crude dithiophosphoric acid ester product, the dithiophosphoric acid ester reaction product obtained as described is reacted with zinc or a basic zinc compound, for example, zinc oxide, preferably the latter, in a mol ratio of about 0.5 to about one mol of the zinc or zinc compound for each 2 mols of the crude dithiophosphoric acid ester product. This will correspond to a ratio of about 0.5 to one mol of zinc or zinc compound per mol of phosphorus pentasulfide employed in the initial reaction. It is preferred to react the crude thiophosphoric acid ester product with as much zinc as possible. Usually, one mol will provide a moderate excess The salt-forming reaction begins to take place spontaneously with evolution of heat with gradual addition of zinc or basic zinc compound, at atmospheric pressure, and at temperatures of 60° F. or above. In order to minimize side reactions, it is important to maintain the salt-forming reaction at a temperature not greater than 180° F. until the reaction is substantially complete. In the presently disclosed combination, appreciable departure from the temperatures indicated will have a material effect on the ultimate composition. In order to insure completion of the reaction the temperature is then raised to about 180° to 280° F., preferably about 250° F., for at least about 30 minutes, preferably about 2 hours. The higher temperature can be maintained for a longer period but with no additional advantage. The product is then cooled, preferably to room temperature.

Although the preparations of the crude dithiophosphoric acid esters and the zinc salts thereof have been described in successive stages, the entire reaction can in some instances be carried out in a single operation, if desired. According to this procedure, the alcohol or phenol and the basic zinc compound are admixed and phosphorus pentasulfide is added to the mixture, while maintaining the temperature of the reaction mixture within the range disclosed above. In other instances, for example, where Oxo octyl alcohols are employed, the single mix procedure has resulted in a runaway reaction.

The metal salt product resulting from the above-described procedures will consist essentially of zinc salts of mixed acid thiophosphoric esters, possibly together with smaller amounts of unreacted acidic thiophosphoric esters and/or acidic zinc salts thereof, together with the above-mentioned unstable and/or malodorous side reaction products.

According to the process of this invention there is added to the foregoing reaction product a small amount of a basic alkaline earth metal compound and benzoyl peroxide. The basic alkaline earth metal compound is added in an amount sufficient to raise the pH of the reaction mixture at least to about 6.0, and preferably to about 7. Larger quantities of basic alkaline earth metal compound can be added and reacted, especially when basic salts are desired in the final product. Calcium hydroxide and calcium oxide are examples of preferred basic alkaline earth metal compounds. However, the invention also includes the use of other basic alkaline earth metal compounds such as barium hydroxide, barium oxide, strontium hydroxide and the like.

The use of benzoyl peroxide is considered important to the invention not only with respect to the process and its results but also with respect to the performance characteristics of the final product. The benzoyl peroxide is added in the amount of about 0.5 to about 2 percent by weight of the reaction mixture. While larger amounts of benzoyl peroxide can be added, no additional benefits with respect to deodorization are obtained by the use of such larger amounts. The final product of the process described herein in its entirety comprises principally mixed zinc-alkaline earth metal salts of thiophosphoric acid esters wherein the phosphorus sulfur mol ratio is substantially more than 1:2, normally about 2:3.

Although it is preferred to carry out successively the reaction of the basic alkaline earth metal compound and the benzoyl peroxide with the zinc thiophosphoric ester reaction product, this is not essential, and if desired, the benzoyl peroxide and the basic alkaline earth metal compound can be added and reacted concurrently or in the opposite order. It is emphasized, however, that both the benzoyl peroxide and the basic alkaline earth metal compound must be employed in the process of this invention in order to obtain stable, light-colored products that are essentially free from malodorous impurities. When only the benzoyl peroxide is employed the resultant product is apparently unstable as evidenced by the development of color-forming bodies on standing. These color-forming materials, being products of deterioration, are undesirable as their presence may tend to affect the performance characteristics of the ultimate mineral oil additive agent. When only the basic alkaline earth metal compound is employed, the resultant mixed metal thiophosphoric ester product will still contain the malodorous side reaction products referred to above, as is also the case when neither benzoyl peroxide nor the basic alkaline earth metal compound is employed.

After adding the basic alkaline earth metal compound and benzoyl peroxide the reaction mixture is maintained between about 200° and 300° F., preferably about 225° to about 275° F., for a period sufficient to complete the reaction. Usually between about 15 minutes and about 2 hours suffices for this purpose. The product is then filtered to remove solids.

The invention may be more thoroughly understood by reference to the following illustrative specific embodiment:

*Example I*

A charge stock consisting of about 70 percent by weight of Oxo octyl alcohols and 30 percent by weight of phosphorus pentasulfide is charged to a reaction vessel and reacted while maintaining the temperature of the reaction mixture between 130° and 200° F., until the rate of reaction has diminished substantially as evidenced by substantial disappearance of solid phosphorus pentasulfide. The foregoing reactant proportions correspond to a mol ratio of about 4 mols of alcohol per mol of phosphorus pentasulfide. The Oxo octyl alcohol referred to in this example has the following characteristics:

Gravity, ° API _____ 38.5
Viscosity kinematic, 20° C., cs. _____ 12.43
Flash, OC, ° F. _____ 175
Distillation:
 Over point, ° C. _____ 184
 End point, ° C. _____ 188
 50% point, ° C. _____ 186.4

The temperature of the foregoing reaction mixture is then raised to 300° F. for an hour to insure completion of the reaction. The reaction product, consisting chiefly of the di Oxo octyl acid esters of dithiophosphoric acid, together with miscellaneous side reaction products, is then cooled to about 100° F., and zinc oxide is gradually and slowly added in a ratio of one mol per mol of phosphorus pentasulfide, or in other words until the make-up of the over-all reaction mass corresponds to 89.7 percent by weight of the crude di Oxo octyl acid ester of dithiophosphoric acid calculated as such and 10.3 percent by weight of zinc oxide. The temperature of the salt-forming reaction is kept just at or below about 180° F. during addition of the zinc oxide. The temperature of the reaction mixture is then raised to about 250° F. and maintained there for about 2 hours to complete the reaction, after which the mixture is cooled to room temperature.

An amount of lime, sufficient to raise the pH of the mixture from about 2 to about 7, and a small amount of benzoyl peroxide are now added to the foregoing reaction product and thoroughly mixed. The make-up of this reaction mixture corresponds approximately to 94.0 weight percent of zinc Oxo octyl thiophosphoric ester reaction product, 5 weight percent lime and one percent by weight of benzoyl peroxide. After adding the lime and benzoyl peroxide and mixing the reactants, the reaction mixture is then heated to a temperature of about 250° F. for one hour to insure completion of the reaction. The product is then filtered.

A product prepared essentially according to the foregoing procedure consisted essentially of highly stable, light-colored, mixed zinc and calcium salts of Oxo octyl esters of thiophosphoric acids and had the following characteritstics:

|  | Example I Reaction Product | Theory for $C_{32}H_{68}O_4S_4P_2Zn$ |
|---|---|---|
| Color, ASTM Union | <1 | ----- |
| Odor | Faint Alcohol | ----- |
| Sulfur, Percent | 13.45 | 16.60 |
| Phosphorus, Percent | 8.86 | 8.02 |
| Zinc, Percent | 8.50 | 8.46 |
| pH Value | 7.0 | ----- |
| Sulfated Residue, Percent | 27.7 | 20.85 |
| Calcium, Percent | 1.13 | ----- |

The product was stable on standing as evidenced by the absence of any color degradation.

Other stable, light-colored, mixed metal salts of thiophosphoric esters are obtained by substituting respectively for the octyl alcohol and lime of the foregoing example, in the same or equivalent proportions, n-hexanol, cyclohexanol, phenol, octyl phenol, amyl cyclohexanol, propyl cyclohexanol, methyl cyclopentanol, lauryl alcohol, and barium hydroxide and strontium hydroxide. Good results are also obtained by varying the reaction conditions described in the foregoing example within the limits disclosed elsewhere herein.

The mixed metal salts prepared according to this invention impart valuable detergent and anti-wear properties to mineral lubricating oils when incorporated in the latter amounts of about 0.01 percent to about 5 percent and preferably from about 0.5 to about 2.0 percent. Example of such compositions follow:

| Base Oil | Additive | Concentration, Percent |
|---|---|---|
| Example II: Highly Refined Paraffinic Lubricating Oil. | Mixed Zn-Ca Salts of Example I. | 1.0 |
| Example III: Same as Example II. | Mixed Zn-Ba Salts of Crude 2 - methyl,4 - dimethylpentyl Phenolic Ester of Thiophosphoric Acids prepared using procedure of Example I. | 1.5 |
| Example IV: Same as Example II. | Mixed Zn-Ca Salts of Crude Cyclohexyl Ester of Thiophosphoric Acids prepared using procedure of Example I. | 2.0 |

In order to demonstrate the improved lubricating properties of lubricating oils containing additives prepared according to the process of this invention there was incorporated in a highly refined, paraffinic motor oil stock of SAE 20 grade, one percent by weight of the mixed metal salts prepared as described in Example I, and the compounded lubricating oil was subjected to a test procedure that comprised rotating a single steel ball at a preselected speed in contact with 3 additional steel balls held immobile beneath the first ball in a cradle. The 3 immobile steel balls and the rotating single steel ball were forced into contact with each other in response to a preselected, vertically applied load. Sufficient test lubricant was previously poured into the test cup to cover the 3 lower balls to a predetermined depth. The test was carried out by continuing the rotation of the single steel ball in contact with the 3 immobile steel balls for one hour. During the test the oil in the test cup was maintained at a temperature of 266° F. At the conclusion of the test, wear was measured by examination of the wear scars on the clean surfaces of the 3 stationary test balls under a microscope, the two maximum right angle diameters of each wear scar being measured to the closest 0.01 mm., and averaged. According to the variation of the test investigated in the present instance, the oil was rated to determine the maximum load before breakdown of the lubricating oil film. Film breakdown is usually evidenced by seizure and evolution of heat and oil smoke. For the purposes of comparison the above-described compounded lubricating oil was tested with another compounded lubricating oil consisting of the same base stock and one percent by weight of a commercial zinc dicyclohexyl dithiophosphate additive. The results of the foregoing tests are presented below:

|  | Lube Oil +1% Example I Product | Lube Oil +1% Commercial Additive |
|---|---|---|
| Film Breakdown Test: 4-Ball Spindle |  |  |
| Speed, r.p.m | 1,800 | 1,800 |
| Duration of Test, Hr. | 1 | 1 |
| Temperature of Test, ° F | 266 | 266 |
| Rating, Maximum Load, Kg | 51.0+ | 51.0+ |
| Average Scar Diameter | 0.958 | 1.090 |
| Mean Specific Pressure, p.s.i. | 41,200 | 31,800 |

Although it was determined from the foregoing tests that the lubricating film of neither oil broke down at the 51 kilogram limit of the test, the results are significant in that the oil prepared according to this invention withstood a substantially greater mean specific pressure while so doing, and also in that the lubricating oil prepared according to this invention reduced wear. In contrast to the foregoing results a sample of the uninhibited lubricating oil base stock suffered film breakdown at a 27 kilogram load, that is, when the lubricating oil film between adjacent wearing surfaces was subjected to a mean specific pressure of only 27,600 pounds per square inch.

An example of the use of the basic alkaline earth metal compound-benzoyl peroxide treatment apart from the combination in its entirety is found in the treatment of a sample of commercial malodorous zinc dihexyl dithiophosphate prepared by a method other than that described herein, having a sulfur:phosphorus ratio of about 2:1, and having an acidic pH, with 5 percent by weight of lime and 1.0 percent benzoyl peroxide and maintaining the temperature of the reaction mixture at 250° F. for about one hour, followed by filtering to remove solids. When this process is carried out, the product will still possess a sulfur:phosphorus ratio of about 2:1, will have an essentially neutral pH, and will be essentially free from unpleasant odors.

To compounded lubricants containing additives prepared according to this invention there can also be added other improvement agents that are capable of improving the oils in one or more respects. For example, there can be added to the lubricants of this invention, detergents, antioxidants, viscosity index improvers, bloom control agents, dyes, sludge inhibitors, rust and corrosion inhibitors and the like.

Many additional embodiments will be seen by those skilled in the art and can be resorted to without departing from the spirit or scope of the invention. Accordingly, I do not intend to be restricted to the specific embodiments described herein, but only by the scope of the claims appended hereto.

I claim:

1. The process comprising reacting phosphorus pentasulfide with a member selected from the group consisting of aliphatic monohydric alcohols and phenols that contain 6 to 14 carbon atoms per molecule on the average in a mol ratio, respectively, of about 1:4, said reaction being effected at a temperature of about 130° to 350° F., and reacting the resultant product with a member selected from the group consisting of zinc metal and a basic zinc compound in a mol ratio of about 0.5 to 1 mol of said member per mol of phosphorus pentasulfide at temperatures of about 60° to 180° F., then reacting the resulting reaction product with sufficient basic alkaline earth metal compound to raise the pH of the reaction mixture to at least about 6 and about 0.5 to about 2 percent by weight of benzoyl peroxide, at a temperature of about atmospheric temperature to 300° F.

2. The process of claim 1 wherein said member is an aliphatic monohydric alcohol containing 6 to 14 carbon atoms per molecule.

3. The process comprising reacting mixed isomeric Oxo octyl alcohols with phosphorus pentasulfide in a mol ratio of about 4:1 at a temperature between about 130° and about 350° F., and reacting the resultant product with zinc oxide in a mol ratio of about 0.5 to about 1 mol of zinc oxide per mol of phosphorus pentasulfide, the reaction being effected at temperatures of about 60° and about 180° F., then reacting the resulting reaction product with sufficient calcium hydroxide to raise the pH of the reaction to about 7 and about 0.5 to about 2 percent of benzoyl peroxide, at a temperature of about atmospheric temperature to about 300° F.

4. The product obtained by the process of claim 1.

5. A lubricant composition comprising a major amount of a mineral lubricating oil and containing a minor amount, sufficient to improve the wear-reducing characteristics of said oil, of a product prepared according to the process of claim 1.

6. A lubricant composition comprising a major amount of a mineral lubricating oil and containing a minor amount, sufficient to improve the wear-reducing characteristics of said oil, of a product prepared according to the process of claim 2.

7. A lubricant composition comprising a major amount of a mineral lubricating oil and containing a minor amount, sufficient to improve the wear-reducing characteristics of said oil, of a product prepared according to the process of claim 3.

8. The lubricant of claim 5 wherein said product is contained in an amount of about 0.5 to about 2.0 percent by weight of the composition.

References Cited in the file of this patent

UNITED STATES PATENTS

| | | |
|---|---|---|
| 2,385,832 | Musselman | Oct. 2, 1945 |
| 2,441,587 | Musselman | May 18, 1948 |
| 2,768,999 | Hill | Oct. 30, 1956 |
| 2,800,467 | Garwood et al. | July 23, 1957 |
| 2,824,836 | Smith et al. | Feb. 25, 1958 |